G. E. SMITH.
TOY.
APPLICATION FILED JUNE 17, 1920.
1,407,093.
Patented Feb. 21, 1922.
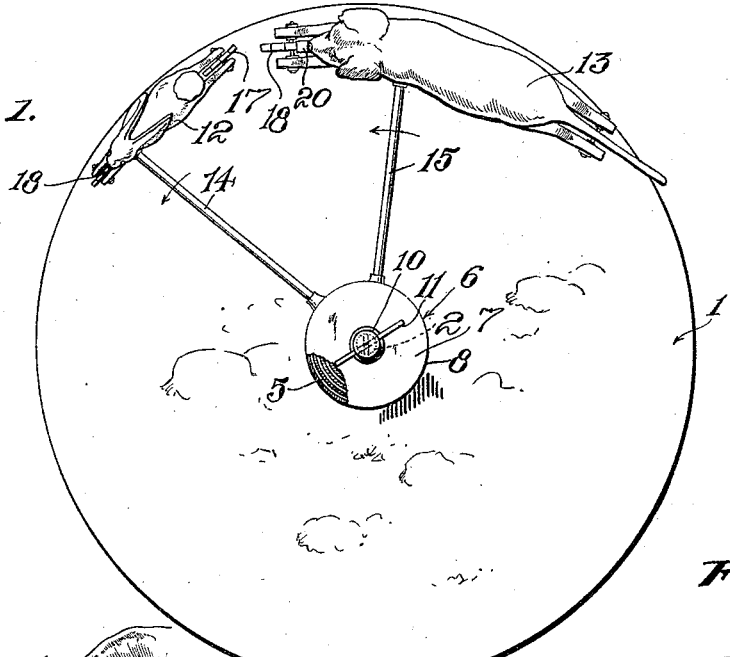
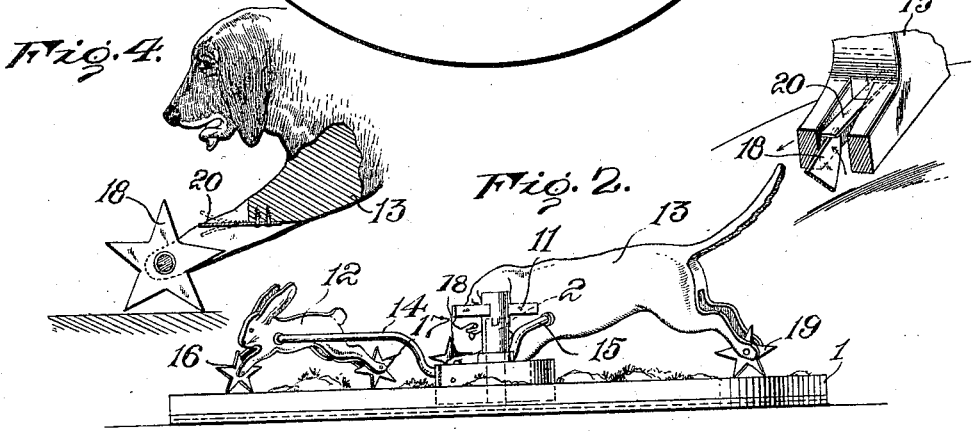
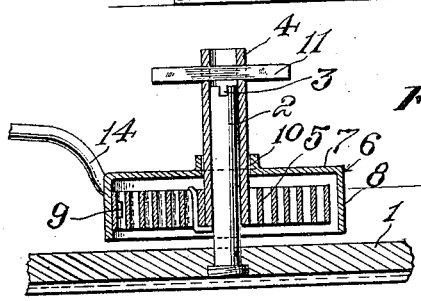
INVENTOR.
G. E. Smith.
BY
Lacey & Lacey,
ATTORNEYS.

UNITED STATES PATENT OFFICE.

GEORGE E. SMITH, OF HUDSON, COLORADO.

TOY.

1,407,093.      Specification of Letters Patent.     Patented Feb. 21, 1922.

Application filed June 17, 1920. Serial No. 389,625.

*To all whom it may concern:*

Be it known that I, GEORGE E. SMITH, a citizen of the United States, residing at Hudson, in the county of Weld and State of Colorado, have invented certain new and useful Improvements in Toys, of which the following is a specification.

This invention relates to toys and has as its general object to provide a toy of the spring motor type which will, in its operation, render a simulation of the pursuit of one animal by another.

Another object of the invention is to provide means in connection with one of the animal figures, for producing a raucous sound to simulate for example the barking of a dog.

A further object of the invention is to automatically impart to the figures, in their rotary movement, an up and down motion to a suitable degree to represent to a desired extent the body motion of an animal when in the act of running.

Another object of the invention is to provide a novel construction of spring motor for imparting motion to the animal figures.

In the accompanying drawing:

Figure 1 is a top plan view of the device embodying the present invention;

Fig. 2 is a side elevation thereof;

Fig. 3 is a detail perspective view illustrating the sound creating means employed in connection with one of the animal figures;

Fig. 4 is a view partly in side elevation and partly in front to rear section illustrating the forepart of one of the animal figures;

Fig. 5 is a detail vertical transverse sectional view illustrating the construction of the spring motor.

The toy embodying the present invention includes in its structure a base which is indicated in general by the numeral 1, and which may be of any suitable material and of any desired marginal contour although preferably circular as illustrated in the drawings. Mounted upon or within this base at the axis thereof is an upstanding post 2 which, for a purpose to be presently explained, is provided in its upper end with a notch indicated by the numeral 3. Rotatably fitted upon this post is a sleeve 4 to the lower end of which is connected one end of a coil spring 5 which constitutes the motor spring. This spring is housed within a drum which is indicated by the numeral 6 and which comprises a top 7 and a depending flange 8, and the other or outer end of the spring is connected as at 9 with the said flange of the drum. The drum is open at its bottom but adapted to be closed by the upper surface of the base, and the casing is formed in its top 7, axially, with an opening 10 loosely receiving the sleeve 4 so that the sleeve may rotate independently of the drum or casing and vice versa. In order that the sleeve 4 may be manually rotated so as to wind the spring 5 and place the same under tension a cross bar 11 is fitted through the upper end portion of the said sleeve and not only extends transversely of the bore of the sleeve but also projects at its ends beyond the surface of the sleeve so that these ends constitute finger pieces for the purpose stated.

In the drawings the numerals 12 and 13 indicate generally two figures which may represent animals or other animate or even inanimate things which in their natural state are capable of traveling or being propelled, and in the present instance the numeral 12 indicates a rabbit and the numeral 13 indicates a dog. These two figures are faced in the same direction and are positioned in such a manner that the idea suggested is that of the dog chasing the rabbit. In order to support the figures, arms 14 and 15 are secured to the flange 8 or if desired to the top 7 of the drum or casing 6 and extend substantially radially therefrom and are suitably connected at their outer ends to the respective figures 12 and 13. Between the fore and hind legs of the rabbit figure 12 are rotatably mounted spur wheels indicated by the numerals 16 and 17 respectively, and likewise between the fore and hind legs of the dog figure are rotatably mounted spur wheels indicated respectively by the numerals 18 and 19. The arms 14 and 15 are so positioned that the spurs or teeth of all of these wheels will engage the upper surface of the base 1 as the figures circle above the base and it will be evident that inasmuch as the spurs of the several wheels are relatively widely spaced, the figures 12 and 13 will be given a bounding motion as they are moved over the surface of the base so that the toy in its operation will as nearly as possible simulate the natural body movements of these animals in the act of running.

At this point it will be understood that by holding the drum or casing 6 stationary, the sleeve 4 may be rotated through the medium of the cross bar 11 thus placing the spring 5 under tension. Then after the spring has been fully wound, the sleeve 4 may be lowered until the intermediate portion of the cross bar 11 or in other words that portion which extends diametrically of the bore of the sleeve, engages in the notch 3 in the upper end of the post 2. Then if the drum or casing 6 is released, the spring 5, in unwinding, will rotate the said drum or casing and impart angular movement to the arms 14 and 15 thereby causing the animal figures 12 and 13 to circle above the base 1 so that the idea suggested is that of the animal figure of the dog 13 being in close pursuit of the rabbit figure 12. Of course, when the spring is to be again wound, the sleeve 4 will be slid upwardly upon the post 2 until the said intermediate portion of the cross bar 11 is disengaged from the notch 3, but when the cross bar is engaged in this notch as above pointed out, the sleeve 4 will be securely held stationary with the post 2 so that the spring in unwinding must rotate the drum or casing 6 for the purpose stated.

In order that the toy may not only simulate motion but also the sound or sounds which would in nature be delivered by the animal in pursuit, means is provided in connection with the dog figure 13 for imitating the bark of this animal and this means comprises a spring tongue 20 which is secured in place as shown in Figs. 3 and 4 of the drawings in such a manner that its free end will project in the path of movement of the points of the spurs comprising the wheel 18. Thus as the said wheel is rotated through contact with the upper surface of the base 1, the spurs will successively engage against and vibrate the tongue 20 causing the emission of a raucous sound, for the purpose stated.

Having thus described the invention, what is claimed as new:

1. In a device of the class described, a base member, a member rotatable with respect thereto, means for rotating the member, an arm extending from the member, a figure supported by the arm for movement above the base member in the rotation of the rotatable member, and a spur wheel carried by the figure in contact at its periphery with the base whereby to impart an up and down motion to the figure as the same travels over the surface of the base.

2. In a device of the class described, a base member, a member rotatable with respect thereto, means for rotating the member, a fixed arm extending from the rotatable member, a figure supported by the arm and movable over the base in the rotation of the member, a spur wheel carried by the figure and engaging the base in the movement of the figure over the base, and a sounding element having a portion projecting into the path of movement of the spurs of the wheel whereby to produce a sound simultaneously with the movement of the figure.

In testimony whereof I affix my signature.

GEORGE E. SMITH. [L. S.]